US008122137B2

(12) United States Patent
Appelman et al.

(10) Patent No.: US 8,122,137 B2
(45) Date of Patent: Feb. 21, 2012

(54) DYNAMIC LOCATION OF A SUBORDINATE USER

(75) Inventors: Barry Appelman, New York, NY (US);
Andrew Ivar Erickson, Vienna, VA (US); Larry L. Lu, Great Falls, VA (US); Robert Eugene Weltman, Los Altos, CA (US)

(73) Assignee: AOL Inc., Dulles, VA (US)

( * ) Notice: Subject to any disclaimer, the term of this patent is extended or adjusted under 35 U.S.C. 154(b) by 558 days.

(21) Appl. No.: 11/574,831

(22) PCT Filed: Sep. 8, 2004

(86) PCT No.: PCT/US2004/029291
§ 371 (c)(1),
(2), (4) Date: Feb. 13, 2009

(87) PCT Pub. No.: WO2005/057329
PCT Pub. Date: Jun. 23, 2005

(65) Prior Publication Data
US 2009/0213001 A1 Aug. 27, 2009

(51) Int. Cl.
*G06F 17/30* (2006.01)
(52) U.S. Cl. ......... 709/229; 709/217; 709/224; 715/741
(58) Field of Classification Search ................... 709/229, 709/217–219, 224, 223; 715/741, 738; 705/14.4–14.73
See application file for complete search history.

(56) References Cited

U.S. PATENT DOCUMENTS

| | | | |
|---|---|---|---|
| 5,737,726 A | 4/1998 | Cameron et al. | |
| 5,819,084 A | 10/1998 | Shapiro et al. | |
| 5,864,874 A | 1/1999 | Shapiro | |
| 5,870,744 A | 2/1999 | Sprague | |
| 5,960,173 A | 9/1999 | Tang et al. | |
| 6,006,331 A | 12/1999 | Chu et al. | |
| 6,148,328 A | 11/2000 | Cuomo et al. | |
| 6,199,099 B1 * | 3/2001 | Gershman et al. | ............ 709/203 |
| 6,212,548 B1 | 4/2001 | DeSimone et al. | |
| 6,243,039 B1 * | 6/2001 | Elliot | ............ 342/457 |
| 6,243,714 B1 | 6/2001 | Shapiro et al. | |
| 6,301,609 B1 | 10/2001 | Aravamudan et al. | |
| 6,425,012 B1 | 7/2002 | Trovato et al. | |

(Continued)

FOREIGN PATENT DOCUMENTS
WO  WO 01/40957   6/2001

OTHER PUBLICATIONS

U.S. Appl. No. 10/974,969, filed Oct. 28, 2004, 56 pages.

(Continued)

*Primary Examiner* — Kenneth R Coulter
(74) *Attorney, Agent, or Firm* — Finnegan, Henderson, Farabow, Garrett & Dunner, LLC

(57) ABSTRACT

Providing location information to a supervisory user includes providing a parental control, using a computer automatically to determine a location of a subordinate user, and storing location information indicative of the location of the subordinate user in a database. A request of the supervisory user to locate the subordinate user is received and a user interface informs the supervisory user of the location of the subordinate user based on the stored location information. At least one of the storing and/or the informing are based on the parental control.

42 Claims, 9 Drawing Sheets

U.S. PATENT DOCUMENTS

| | | | |
|---|---|---|---|
| 6,434,599 B1 | 8/2002 | Porter | |
| 6,446,119 B1 | 9/2002 | Olah et al. | |
| 6,480,885 B1 | 11/2002 | Olivier | |
| 6,484,196 B1 | 11/2002 | Maurille | |
| 6,487,583 B1 | 11/2002 | Harvey et al. | |
| 6,519,629 B2 | 2/2003 | Harvey et al. | |
| 6,539,421 B1 | 3/2003 | Appelman et al. | |
| 6,549,937 B1 | 4/2003 | Auerbach et al. | |
| 6,564,261 B1 | 5/2003 | Gudjonsson et al. | |
| 6,665,715 B1* | 12/2003 | Houri | 709/223 |
| 6,677,968 B1 | 1/2004 | Appelman | |
| 6,678,719 B1 | 1/2004 | Stimmel | |
| 6,691,162 B1 | 2/2004 | Wick | |
| 6,699,125 B2 | 3/2004 | Kirmse et al. | |
| 6,750,881 B1 | 6/2004 | Appelman | |
| 6,925,469 B2* | 8/2005 | Headings et al. | 1/1 |
| 7,068,769 B1 | 6/2006 | Weaver et al. | |
| 7,076,546 B1 | 7/2006 | Bates et al. | |
| 7,080,139 B1 | 7/2006 | Briggs et al. | |
| 7,092,952 B1 | 8/2006 | Wilens | |
| 7,240,093 B1 | 7/2007 | Danieli et al. | |
| 7,246,371 B2 | 7/2007 | Diacakis et al. | |
| 7,269,627 B2 | 9/2007 | Knauerhase | |
| 7,297,110 B2* | 11/2007 | Goyal et al. | 600/300 |
| 7,299,257 B2 | 11/2007 | Boyer et al. | |
| 7,305,624 B1* | 12/2007 | Siegel | 715/738 |
| 7,337,219 B1* | 2/2008 | Meenan et al. | 709/220 |
| 7,383,339 B1* | 6/2008 | Meenan et al. | 709/227 |
| 7,428,585 B1* | 9/2008 | Owens et al. | 709/223 |
| 2001/0013050 A1 | 8/2001 | Shah | |
| 2001/0013069 A1 | 8/2001 | Shah | |
| 2002/0021307 A1 | 2/2002 | Glenn et al. | |
| 2002/0032729 A1 | 3/2002 | Erickson et al. | |
| 2002/0049806 A1 | 4/2002 | Gatz et al. | |
| 2002/0087630 A1 | 7/2002 | Wu | |
| 2002/0091936 A1 | 7/2002 | Tema | |
| 2002/0097856 A1 | 7/2002 | Wullert | |
| 2002/0118809 A1 | 8/2002 | Eisenberg | |
| 2002/0119789 A1 | 8/2002 | Friedman | |
| 2002/0143565 A1* | 10/2002 | Headings et al. | 705/1 |
| 2002/0144283 A1* | 10/2002 | Headings et al. | 725/109 |
| 2002/0178072 A1 | 11/2002 | Gusler et al. | |
| 2002/0188620 A1 | 12/2002 | Doss et al. | |
| 2003/0023684 A1 | 1/2003 | Brown et al. | |
| 2003/0051161 A1* | 3/2003 | Smith et al. | 713/201 |
| 2003/0055897 A1 | 3/2003 | Brown et al. | |
| 2003/0065721 A1 | 4/2003 | Roskind | |
| 2003/0078987 A1 | 4/2003 | Serebrennikov et al. | |
| 2003/0079024 A1 | 4/2003 | Hough et al. | |
| 2003/0105820 A1 | 6/2003 | Haims et al. | |
| 2003/0106054 A1 | 6/2003 | Billmaier et al. | |
| 2003/0126267 A1 | 7/2003 | Gutta et al. | |
| 2003/0129969 A1 | 7/2003 | Rucinski | |
| 2003/0130014 A1 | 7/2003 | Rucinski | |
| 2003/0154398 A1 | 8/2003 | Eaton et al. | |
| 2003/0156138 A1 | 8/2003 | Vronay et al. | |
| 2003/0156707 A1 | 8/2003 | Brown et al. | |
| 2003/0158855 A1 | 8/2003 | Farnham et al. | |
| 2003/0158864 A1 | 8/2003 | Samn | |
| 2003/0167310 A1 | 9/2003 | Moody et al. | |
| 2003/0174164 A1 | 9/2003 | Capps | |
| 2003/0177190 A1 | 9/2003 | Moody et al. | |
| 2003/0185232 A1 | 10/2003 | Moore et al. | |
| 2003/0191673 A1 | 10/2003 | Cohen | |
| 2003/0191753 A1 | 10/2003 | Hoch | |
| 2003/0197729 A1 | 10/2003 | Denoue et al. | |
| 2003/0204741 A1 | 10/2003 | Schoen et al. | |
| 2003/0206195 A1 | 11/2003 | Matsa et al. | |
| 2003/0206619 A1 | 11/2003 | Curbow et al. | |
| 2003/0208545 A1 | 11/2003 | Eaton et al. | |
| 2003/0210265 A1 | 11/2003 | Haimberg | |
| 2003/0225834 A1 | 12/2003 | Lee et al. | |
| 2003/0225836 A1 | 12/2003 | Lee et al. | |
| 2003/0225850 A1 | 12/2003 | Teague | |
| 2003/0227487 A1 | 12/2003 | Hugh | |
| 2003/0229717 A1 | 12/2003 | Teague | |
| 2003/0233265 A1 | 12/2003 | Lee et al. | |
| 2003/0233416 A1 | 12/2003 | Beyda | |
| 2003/0233417 A1 | 12/2003 | Beyda et al. | |
| 2003/0233650 A1 | 12/2003 | Zaner et al. | |
| 2004/0001480 A1 | 1/2004 | Tanigawa et al. | |
| 2004/0003041 A1 | 1/2004 | Moore et al. | |
| 2004/0003046 A1 | 1/2004 | Grabelsky et al. | |
| 2004/0017396 A1 | 1/2004 | Werndorfer et al. | |
| 2004/0019637 A1 | 1/2004 | Goodman et al. | |
| 2004/0019671 A1 | 1/2004 | Metz | |
| 2004/0024478 A1 | 2/2004 | Hans et al. | |
| 2004/0024822 A1 | 2/2004 | Werndorfer et al. | |
| 2004/0029567 A1 | 2/2004 | Timmins et al. | |
| 2004/0030750 A1 | 2/2004 | Moore et al. | |
| 2004/0044723 A1 | 3/2004 | Bell et al. | |
| 2004/0054729 A1 | 3/2004 | Fukuizumi et al. | |
| 2004/0056901 A1 | 3/2004 | March et al. | |
| 2004/0098491 A1 | 5/2004 | Costa-Requena et al. | |
| 2004/0103156 A1 | 5/2004 | Quillen et al. | |
| 2004/0117831 A1 | 6/2004 | Ellis et al. | |
| 2004/0148347 A1 | 7/2004 | Appelman et al. | |
| 2004/0153506 A1 | 8/2004 | Ito et al. | |
| 2004/0186887 A1 | 9/2004 | Galli et al. | |
| 2004/0193684 A1 | 9/2004 | Ben-Yoseph | |
| 2004/0196315 A1 | 10/2004 | Swearingen et al. | |
| 2004/0199582 A1 | 10/2004 | Kucharewski et al. | |
| 2004/0231003 A1 | 11/2004 | Cooper et al. | |
| 2005/0004984 A1 | 1/2005 | Simpson | |
| 2005/0021854 A1 | 1/2005 | Bjorkner | |
| 2005/0091314 A1 | 4/2005 | Blagsvedt et al. | |
| 2005/0096084 A1 | 5/2005 | Pohja et al. | |
| 2005/0108329 A1 | 5/2005 | Weaver et al. | |
| 2005/0114783 A1 | 5/2005 | Szeto | |
| 2005/0149606 A1 | 7/2005 | Lyle et al. | |
| 2005/0171955 A1 | 8/2005 | Hull et al. | |
| 2005/0172001 A1 | 8/2005 | Zaner et al. | |
| 2005/0289469 A1 | 12/2005 | Chandler et al. | |
| 2006/0009243 A1 | 1/2006 | Dahan et al. | |
| 2006/0031080 A1 | 2/2006 | Mallya et al. | |
| 2006/0047187 A1* | 3/2006 | Goyal et al. | 600/300 |
| 2006/0136584 A1 | 6/2006 | Decker et al. | |

OTHER PUBLICATIONS

International Application No. PCT/US2004/029291, filed Sep. 8, 2004, 47 pages.

International Search Report mailed Dec. 27, 2005 for International Application No. PCT/US04/29291, filed Sep. 8, 2004, 5 pages.

International Search Report for International Application No. PCT/US05/45630, Dated Oct. 23, 2006, 5 pages.

Office Action mailed Jan. 8, 2008 for U.S. Appl. No. 10/415,211, filed Nov. 18, 2003, 20 pages.

Written Opinion mailed Dec. 27, 2005 for International Application No. PCT/US04/29291, filed Sep. 8, 2004.

Written Opinion for International Application No. PCT/US05/45630, Dated Oct. 23, 2006, 6 pages.

Haim Schneider, Lotus Developer Domain, "Adding a popup menu to your Sametime links", Jul. 1, 2003, 8 pages.

IBM Lotus Software, Sametime Everyplace FAQ Overview Information, http://www.lotus.com/products/wireless.nsf/allpublic.., (visited Jul. 28, 2003), 3 pages.

IBM Lotus Software, Sametime Everyplace Wireless Collaboration that's Fit for e-Business, http://www.lotus.com/products/wireless.nsf/allpublic.., (visited Jul. 28, 2003), 2 pages.

Kirk Scott, "Ubique's Virtual Places: Communication and interaction on the World Wide Web", http://www.w3.org/Collaboration/Workshop/Proceedings/P2.html, (visited Jul. 28, 2003), 1 page.

Tara Hall, Lotus Developer Domain, "Same Place, Sametime with Chris Price", http://www-10.lotus.com/ldd/today.nsf/DisplayForm/.., (visited Jul. 28, 2003), 8 pages.

Office Action issued in U.S. Appl. No. 10/974,969 mailed Mar. 17, 2008, 23 pages.

Notification of Transmittal of the International Search Report and the Written Opinion of the International Searching Authority for International Application No. PCT/US2004/029291; Dec. 27, 2005; 9 pages.

* cited by examiner

DYNAMIC LOCATION OF A SUBORDINATE USER

TECHNICAL FIELD

This invention relates to location of a subordinate user.

BACKGROUND

Communication technologies, such as mobile phones and the internet, have proliferated. As a result, children have ever greater freedom to move within the information world, and to do so from a variety of physical locations. Not all locations, however, are age appropriate, and the mobility and pervasiveness of communication technology may render impractical "eyes-on" supervision of the locations visited by a child or other user. "Eyes-on" supervision, moreover, generally reduces a child's sense of autonomy, and may require inordinate parental involvement.

SUMMARY

In one general aspect, providing location information to a supervisory user includes providing a parental control, using a computer automatically to determine a location of a subordinate user, and storing location information indicative of the location of the subordinate user in a database. A request of the supervisory user to locate the subordinate user is received and a user interface informs the supervisory user of the location of the subordinate user based on the stored location information. At least one of the storing and the informing are based on the parental control.

Implementations may include one or more of the following features. For example, providing the location information may include using the computer to determine a changed location of the subordinate user, using the database to update the stored location information based on the changed location, and using the user interface to inform the supervisory user of the changed location based on the updated stored location information. Informing the supervisory user of the changed location may include refreshing the information communicated by the user interface based on a predetermined interval.

Storing the location information may include storing an indication of the present location of the subordinate user. Location information indicative of past locations of the subordinate user also may be stored and the supervisory user may be informed of a past location of the subordinate user. The database may store the location information in relation to the subordinate user.

The supervisory user and the subordinate user may be associated through a familial relationship, and may hold related online accounts.

The parental control may include a white list indicative of an online location approved for visitation by the subordinate user and/or a black list indicative of an online location disapproved for visitation by the subordinate user. Providing location information may include informing the supervisory user of locations visited by the subordinate user that are included on the black list but not of locations that are included on the white list.

The parental control may indicate a range of location information of which the supervisory user desires to be informed. For example, the parental control may indicate that the supervisory user is to be informed of a predetermined number of the most recent locations visited by the subordinate user, of the locations most frequently visited by the subordinate user, and/or of the locations visited by the subordinate user within a defined period of time. The parental control also may include a textual analysis rule.

Determining the location of the subordinate user may include determining an online location and location information associated with the online location. The location information may include, for example, a universal resource locator (URL), an internet protocol (IP) address, and/or an identifier of an internet domain associated with the online location. The location information may include a television channel and/or an identification of a television program. The supervisory user may be enabled dynamically to access the online location of the subordinate user based on the location information.

Determining the location of the subordinate user also may include determining a physical location of the subordinate user, for example, based on information communicated by a global positioning system (GPS). Location information describing the physical location may include a physical address, a longitude and/or a latitude, and/or a name of a physical location.

The request of the supervisory user for information may include an identification (e.g., a screen name) of the subordinate user from a contact list of the supervisory user.

The supervisory user also may be enabled to communicate with the subordinate user in relation to a location visited by the subordinate user. The communication between the supervisory user and the subordinate may be enabled using an instant message, an email, a voice communication, and/or any other suitable electronic communication.

These general and specific aspects may be implemented using a method, a system, or a computer program, or any combination of systems, methods, and computer programs.

Other features will be apparent from the description, the drawings, and the claims.

DESCRIPTION OF DRAWINGS

Like reference symbols in the various drawings indicate like elements.

DETAILED DESCRIPTION

An online service provider may enable an online user to determine dynamically and in real time the location of another user, such as, for example, a child or other subordinate user. For instance, the user may perceive a web page or URL presently viewed by the other user, a physical location of the other user, and/or a log of the past online activity of the subordinate user.

Figure 1:
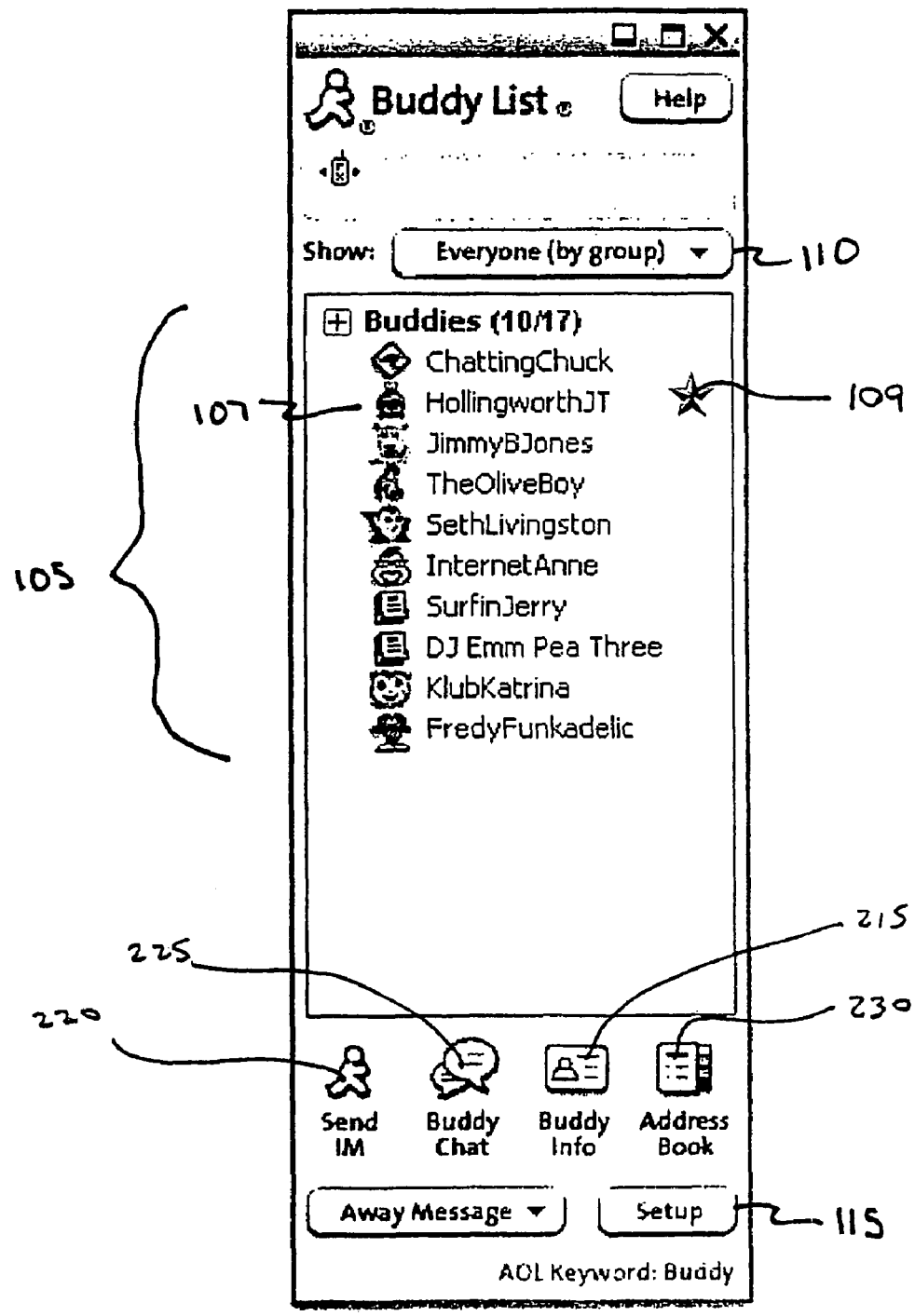
FIGS. 1-3 illustrate graphical user interfaces (GUIs) that may be used by a supervisory user to dynamically locate a subordinate user.

FIG. 1 illustrates a graphical user interface 100 (buddy list interface) that a supervisory user (e.g., a parent or guardian) may use to locate another user (e.g., a subordinate user such as a child). The buddy list interface 100 lists contacts 105 (e.g., buddies) of the supervisory user. The listed contacts may be identified to the supervisory user using textual and or graphical identifiers, such as, for example, a name (e.g., a screen name) and/or an icon. A subordinate user 107 may be identified from among the other contacts based on an additional identifier. For example, buddy list interface 100 uses a star icon 109 to the right of HollingworthJT to identify HollingworthJT as a subordinate user. In addition or as an alternative, other forms of identification may be used. For example, the subordinate user may be listed in a separate group (e.g., a subordinate user group or a family group), and/or the identifier of the subordinate user may be highlighted visually.

The supervisory user may use a button 110 (the "Show" button) to select between various formats for listing the subordinate user 107 and other contacts of the supervisory user. The supervisory user may use a button 115 (the "Setup" button) to control the location information that is gathered with respect to the subordinate user 107 and/or how that information is presented.

Figure 2:
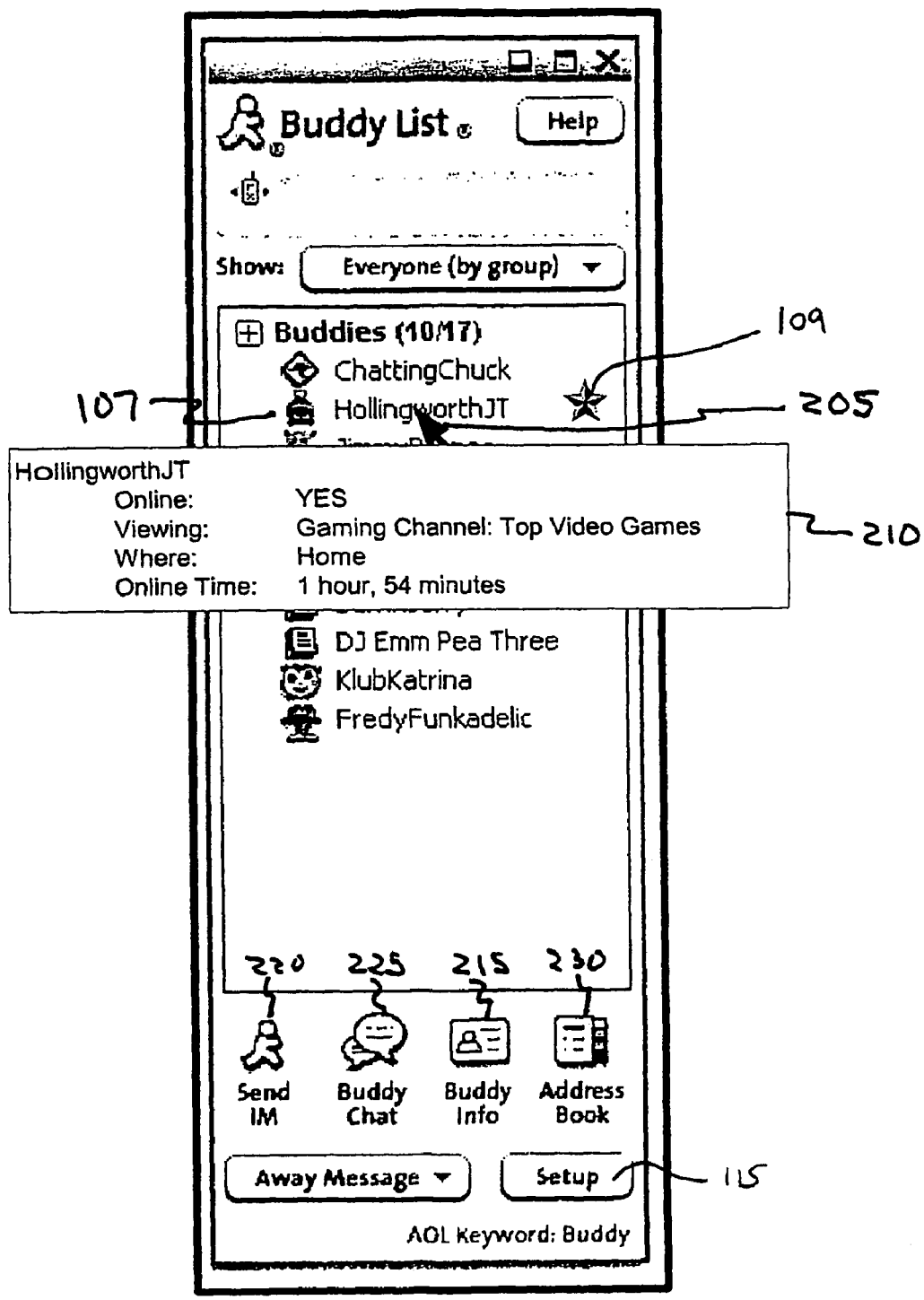

Referring to FIG. 2, the buddy list interface 100 enables the supervisory user to obtain information related to the subordinate user 107, such as, for example, location information. For instance, the supervisory user may pause or "float" a cursor 205 over the name of the subordinate user 107 to obtain a snapshot 210 of the subordinate user's location and online activity. As illustrated, the snapshot 210 indicates that HollingworthJT presently is online and is visiting "Top Ten Games" at the Games Channel. The snapshot 210 also indicates that HollingworthJT is at home and has been online for 1 hour and 54 minutes. More complete location information may be accessed by opening (e.g., by double clicking) the name of the subordinate user 107 or by using a button 215 (the "Buddy Info" button) after selecting (e.g., by single clicking) the name of the subordinate user 107.

In addition, the supervisory user may communicate with the subordinate user 107 or with another contact using a button 220 (the "Send IM" button) to initiate an instant message or a button 225 (the "Buddy Chat" button) to initiate a chat session. The supervisory user also may use a button 230 (the "Address Book" button) to add or modify contact information for the subordinate user 107 or for other contacts.

Figure 3:
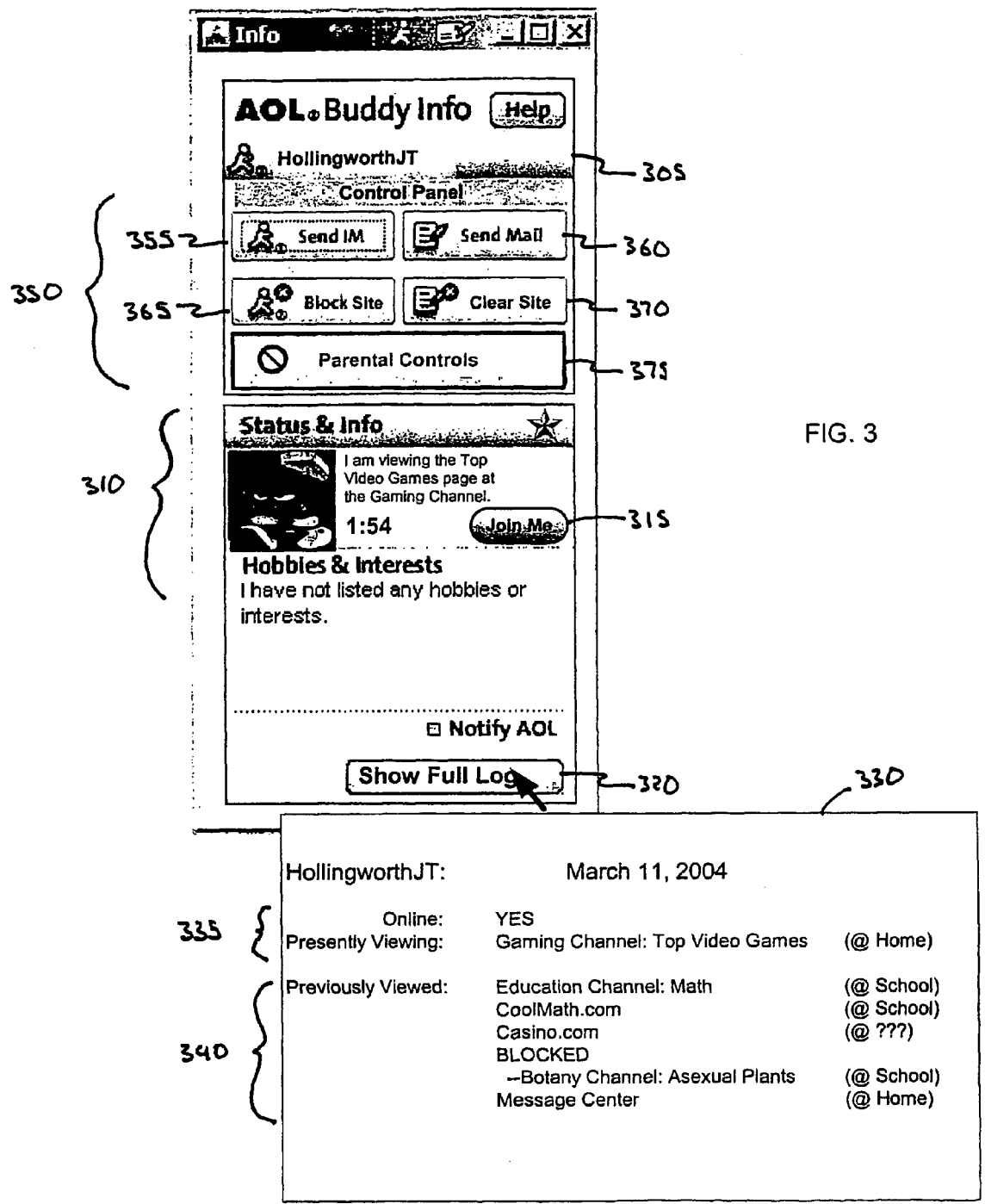

FIG. 3 illustrates a buddy info interface 300 that may be invoked from the buddy list interface 100 of FIG. 1 or based on an alert trigger, for example, of a parental control. The buddy info interface 300 shows or provides access to more complete location information related to the subordinate user 107. The buddy info interface 300 also may be invoked to obtain information related to the other listed contacts 105; however, the information for a particular contact 105 may be less detailed and/or subject to consent of the selected contact 105. Referring to FIG. 1, the buddy info interface 300 may be invoked, for example, by opening the name of the subordinate user 107 or by using the "Buddy Info" button 215 after selecting the name of the subordinate user 107.

Referring again to FIG. 3, the buddy info interface 300 includes an ID bar 305 that identifies the subordinate user 107 for whom information is provided. The buddy info interface 300 also includes an information panel 310 that indicates the current online location of the subordinate user 107. For example, the information panel 310 indicates that HollingworthJT presently is visiting the Top Ten Games page at the Gaming Channel and has been online for 1 hour and 54 minutes. The location information presented in the information panel 310 may be updated at predetermined intervals or dynamically as HollingworthJT moves to a different location. The supervisory user may use a button 315 (the "Join Me" button) to access the present online location of the subordinate user 107, such as, for example, to visit the web page, URL, or chat room presently accessed by the subordinate user 107.

Additionally, or in the alternative, the information panel 310 may indicate a physical location of the subordinate user 107. The physical location may be determined, for example, based on a known physical location of a non-mobile device (e.g., a workstation or a desk-top personal computer) or based on location information provided by a GPS (global positioning system) associated with a mobile device (e.g., a notebook computer, a personal digital assistant, or a mobile telephone) of the subordinate user 107.

The supervisory user may use a button 320 (the "Show Full Log" button) to access a location log (e.g., the location log 330 of the supervisory user 107, HollingworthJT) of present and past location information related to the subordinate user 107. The location log 330 may display location information according to a predetermined window. The window may define a predetermined period of interest, such as, for example, the past twenty-four hours, the current day (e.g., Mar. 11, 2004, as shown), the current week, or any other desired period of time. Other types of windows also may be used (e.g., to define a number of most recently or frequently visited locations).

As shown, the location log 330 indicates present location information 335 related to HollingworthJT (i.e., that HollingworthJT presently is online visiting the Gaming Channel from home). The location log 330 also indicates location information 340 from prior in the day. Specifically, the location log 330 shows that HollingworthJT visited the Math site at the Education channel and also CoolMath.com from school; that HollingworthJT visited the site Casino.com from an unknown location; that, while at school, HollingworthJT was blocked from accessing (e.g., based on an over-inclusive black list) a site on Asexual Plants at the Botany Channel; and that HollingworthJT visited the Message Center from home.

The supervisory user may use the information of the location log 330 to judge, for example, the appropriateness of locations visited by the subordinate user 107, and may use the control panel 350 to respond accordingly. For example, the supervisory user may use the location log 330 to note that HollingworthJT visited the site Casino.com and may determine that Casino.com is inappropriate for the subordinate user 107 to visit. Consequently, the supervisory user may use a button 355 (the "Send IM" button) or a button 360 (the "Send Mail" button) to communicate with the subordinate user regarding the location visited. Specifically, the supervisory user may communicate with HollingworthJT regarding the visit to Casino.com; and may wish to know why HollingworthJT was not at school then, and from where access was made. The supervisory user also may use a button 365 (the "Block Site" button) to block Casino.com from future access by HollingworthJT. In the alternative, the supervisory user may use a button 370 (the "Clear Site" button) to clear a site (e.g., the Asexual Plate site of the Botany Channel) that the supervisory user deems unobjectionable but for which the subordinate user 107 was blocked access.

The supervisory user also may use a button 375 (the "Parental Controls" button) to provide or modify a parental control used to supervise locations visited by the subordinate user 107. The parental control may include age-appropriate default settings that apply to different age classes of users, such as, for example, subordinate users classified as "Kids," "Young Teens," or "Mature Teens." The parental control may include one or more alert triggers that may cause the supervisory user to be quickly notified if the subordinate user visits a particular location or type of location.

The parental control also may include notification information to control delivery of the notification, for example, based on location information of the supervisory user. The location information, whether for a physical or an online location, may be determined similarly to the location of the subordinate user. In any event, the notification information and/or the location information may be used to select among several delivery mechanisms potentially available to the supervisory user. Delivery of the notification based on the location information enhances the likelihood that the notification is received by the supervisory user without significant delay.

In addition or in the alternative to the age-appropriate default settings, the parental control may include a white list defining approved locations (e.g., online educational sites, school, a friend's home) and/or a black list defining a domain of unacceptable locations (e.g., online gambling sites, a local pool hall, the home of a disapproved friend) for which visitation is disapproved. The white list and/or black list may be based on input of a rating authority or by a community of raters. The alert triggers may be used in conjunction with the white list and/or the black list. For example, an alert may indicate the arrival of the subordinate user to a white listed location (e.g., school or a friend's home). On the other hand, an alert also may be triggered when the subordinate user visits a black listed location. Although the white list or the black list may be provided initially as a default, the supervisory user may be enabled to modify or replace either the white list or the black list to better fit the supervisory user's preferences.

The parental control may include a time component used to supervise the times during which online access is permitted. For example, the supervisory user may restrict online access between the hours of 5:30 pm and 7:30 am during the school week, but may allow online access with less restriction in the afternoon after school, on the weekends while the subordinate user 107 is not at school, and during school with respect to school related activities. The time component of the parental control also may control the amount of time during a predetermined period (e.g., the present day, the present week, the preceding twenty-four hours) that the subordinate user 107 may access online sites. The alert triggers also may be used to generate a notification when the subordinate user disregards the time based parental controls.

The parental control may be used to control logging or reporting of the location of the subordinate user 107. The parental control may designate that all locations or only some locations visited by the subordinate user 107 are to be logged. The parental control may indicate that access to locations may be logged based, for example, on an approval status (e.g., based on a white list or a black list). Locations also may be logged based on a time constraint, such as, for example, whether the location is accessed at a non-approved time or is accessed for greater than an approved time. The parental control may indicate that logged locations are to be provided with an access time stamp and/or with an indication of the duration of access.

Figure 4:
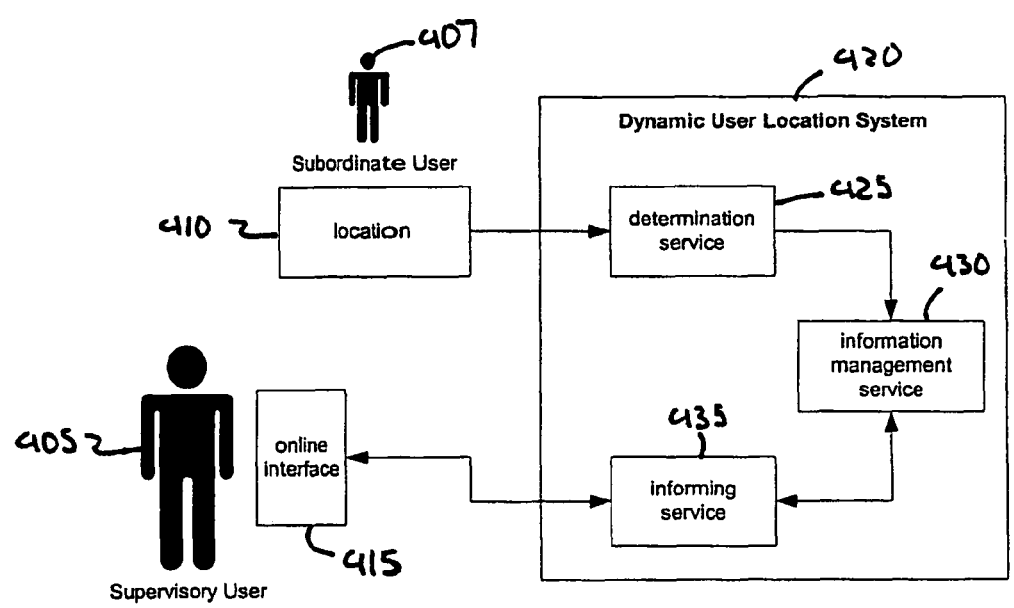
FIG. 4 is a schematic diagram of a system for dynamically locating a subordinate user.

FIG. 4 shows a generalized system 400 used to identify dynamically to a supervisory user 405 locations visited by a subordinate user 407. The supervisory user 405 and the subordinate user 407 may be related through a familial relationship (e.g., a parent-child relationship) and may hold related online accounts. In any event, the system 400 identifies the locations visited by the subordinate user 407 using a dynamic user location system 420. The dynamic user location system 420 includes a determination service 425, an information management service 430, and an informing service 435.

The determination service 425 may be configured to determine the location 410 (e.g., an online location and/or a physical location) of the subordinate user 407, and to communicate information indicative of the location 410. The location 410 may include an online location of the subordinate user 407, such as, for example, a location of the subordinate user 407 at a particular URL (uniform resource locator), chat-room, message board, or newsgroup. The location 410 also may include a physical location determined, for example, from GPS information of a mobile device, identification information (e.g., an internet protocol address, a phone number) of a fixed device having a known physical location, or location information maintained within a fixed or mobile device. The determination service 425 may employ one or more protocols to transfer information internally or to communicate with other components of the dynamic user location system 420.

The information management service 430 maintains information (e.g., present location, log information of past locations, time stamp information, parental control information, identification information and/or contact information) related to the subordinate user 407. The information management service 430 may modify or recharacterize location information obtained from the determination service 425 (e.g., using a map of online or physical location to determine generalized location information), for example, to enable presentation of the location information in a more useful form. In any event, based on the parental control information and/or system default information, the information management service 430 may store some or all of the location information and may manage that information in relation to an identifier of the subordinate user 407. Similarly, the information management service 430 may remove from storage some or all of the location information as indicated by the parental controls and/or system default information. Storing only the information required may improve scalability of the system 400. For example, based on a parental control, the information management service 430 may retain only location information that satisfies a predetermined window (e.g., that falls within a predetermined time period such as a rolling twenty-four hour period or the present week).

The informing service 435 is configured to interface between the supervisory user 405 and the information management service 430. For example, the informing service 435 may be configured to receive a request from the supervisory user 405 for location information related to the subordinate user 407. Based on the request, the informing service 435 is configured to query the information management service 430 for location information related to the subordinate user 407 and to communicate that information to the supervisory user 405, using, for example, the online interface 415. The online interface 415 may correspond generally to the GUIs described above with respect to FIGS. 1-3. The informing service 435 also may be configured as a conduit by which the supervisory user 405 may access and configure parental controls, and/or other control information or parameters maintained, for example, by the information management service 430.

The informing service 435 may enable the supervisory user 405 to communicate with the subordinate user 407, for example, in relation to the location information.

The informing service 435 also may enable the supervisory user 405 to modify the presentation of the location information related to the. subordinate user 407 (e.g., to select among different views or detail levels of the location information as shown in FIGS. 1-3), to obtain related follow-on information, and/or to select or filter information based on various criteria (e.g., based on a selected time period or a specified parental control).

In determining or providing location information, the dynamic user location system 420 may control (or allow the supervisory user 405 to control) the resolution at which the location of the subordinate user 407 is determined or reported. The resolution control function may be performed individually or in combination by one or more of the determination service 425, the information management service 430 and/or the informing service 435.

For example, the determination service 425 may determine a specific location (e.g., a specific web page viewed or an exact longitude and latitude) of the subordinate user 407, but may report a more generalized location (e.g., the web site that includes the viewed page or the school that includes the exact longitude and latitude) that may be more useful to the supervisory user 405. Similarly, the information management service 430 may receive exact location information from the determination service 425, but may maintain generalized location information based on stored or accessed location mapping information. This generalized information may be maintained in addition to or as an alternative to the exact location information. In like manner, the informing service 435 may inform the user 405 of a generalized location that the informing service 435 has determined based on exact location information and location mapping information obtained from the information management service 430. Other functional allocations are possible.

The elements of system 400 may include additional mechanisms for delivering or processing data. The mechanisms may include, for example, any applications, protocols, devices, or networks used to facilitate communication or processing of electronic data. The system elements also may include or be included in a general-purpose or a special-purpose computer, a database, a local area network (LAN), and/or a wide area network (WAN). The response to and execution of instructions received by the system elements may be controlled, for example, by a program, a piece of code, an instruction, a device, a computer system, or a combination thereof, for independently or collectively instructing the system elements to interact and operate as described.

Figure 5:
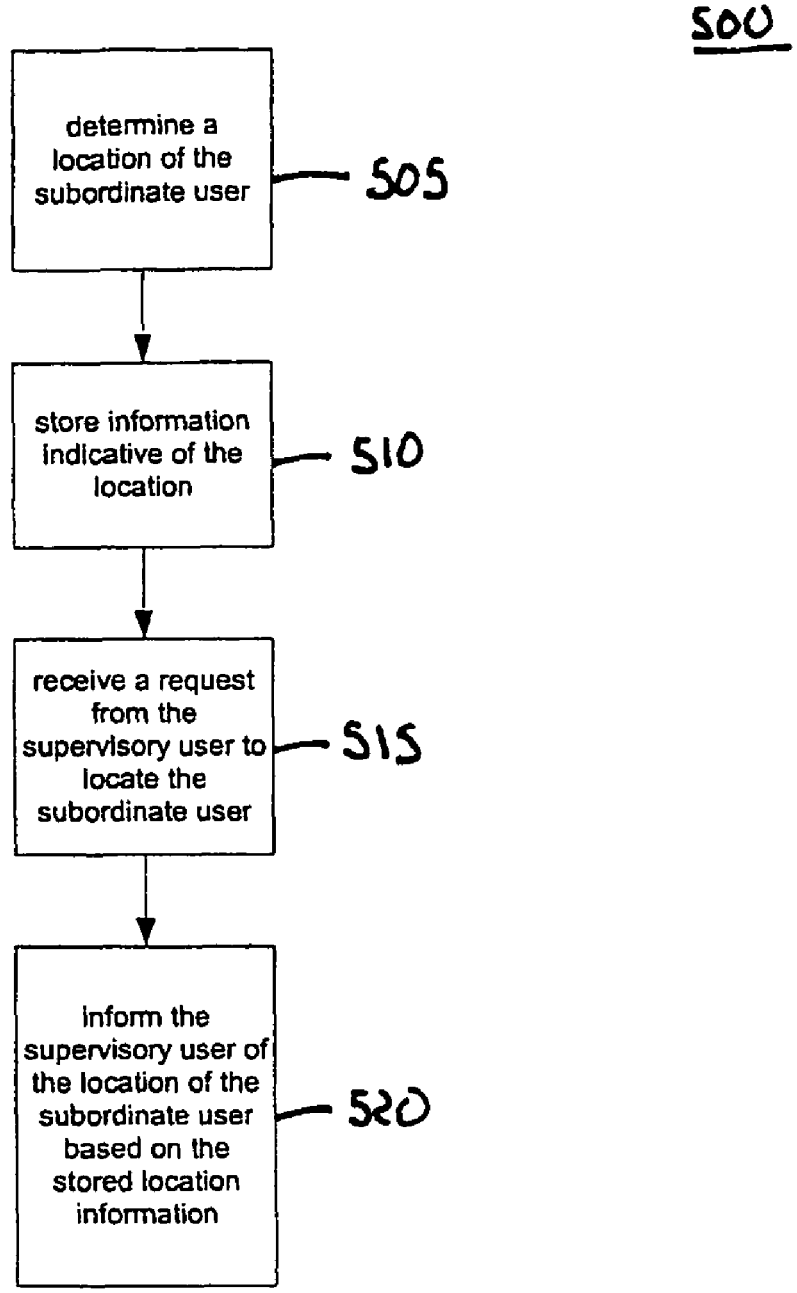
FIG. 5 is a flow diagram of a process implementable by the system of FIG. 5.

FIG. 5 illustrates a flow diagram of a process 500 implementable by system 400 of FIG. 4 to identify dynamically to the supervisory user 405 a location of the subordinate user 407. The determination service 425 determines a location (e.g., an online location or a physical location) of the subordinate user 407 (step 505). The information management service 430 stores information indicative of the location of the subordinate user 407 using, for example, a database record associated with the subordinate user 407 (step 5 10). The informing service 435 receives a request from the supervisory user 405 to locate the subordinate user 407 (step 515). The informing service 435 then informs the supervisory user 405 of the location of the subordinate user 407 based on the stored location information. The informing service 435 may inform the supervisory user 405 using, for example, a pop-up window, a list, a graph, or any other appropriate mechanism. The informing service 435 may inform the supervisory user 405 of the location of the subordinate user 407 in a fashion suitable to enable the supervisory user 405 to communicate (e.g., in real time) with the subordinate user 407.

Figure 6:
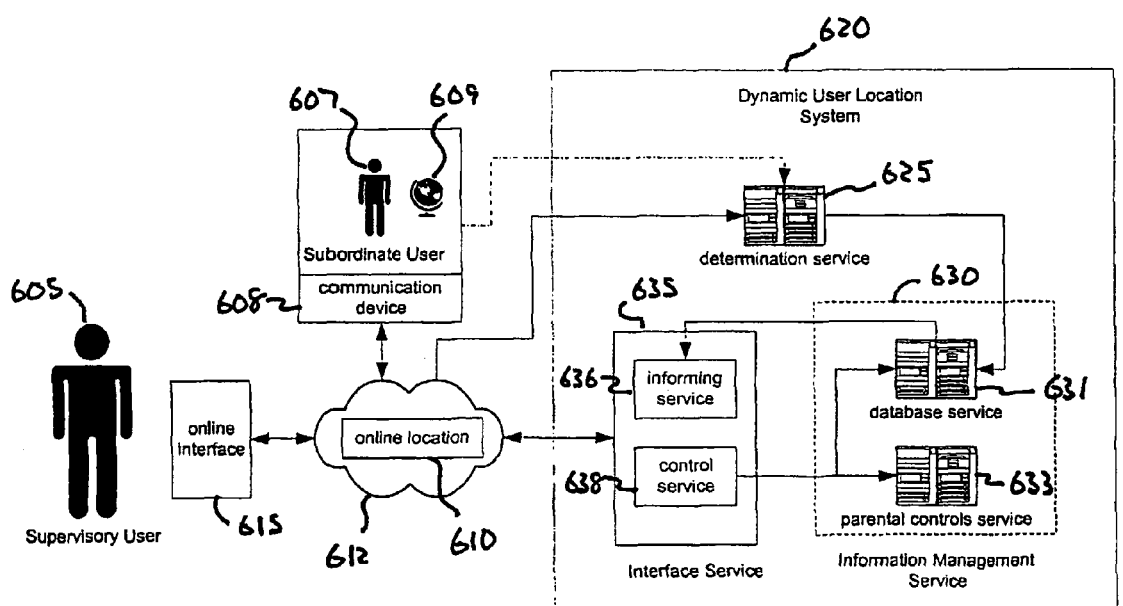
FIG. 6 is a schematic diagram of a user location system.

Referring to FIG. 6, a generalized system 600 identifies dynamically to a supervisory user 605 a location of a subordinate user 607. To this end, the system 600 uses a dynamic user location system 620 having a determination service 630, an information management service 630, and an interface service 635. Components of the location system 600 are described in greater detail below.

The subordinate user 607 may use a communication device 608 at a physical location 609 to visit an online location 610 included within a network 612. The communication device 608 may be configured to provide the subordinate user 607 with online access to the network 612. More generally, the communication device 608 may include any device, system, and/or piece of code that enables the subordinate user 607 to communicate with another device or service. For example, the communication device 608 may include a device such as a notebook computer, a telephone, a pen-enabled computer, a personal digital assistant (PDA), a mobile telephone, and/or a desktop computer. Components of the communication device 608 may include a global positioning system (GPS), a Web browser, an email client, a synchronization client (e.g., a calendar synchronization client or a task list synchronization client), an instant messaging (IM) client, a business productivity application (e.g., a word processing or spreadsheet program), and/or an operating system or operating system kernel residing on a device. The communication device 608 may be arranged to operate within or in concert with one or more other systems, such as, for example, one or more LANs and/or one or more WANs.

The network 612 (e.g., the internet) typically allows direct or indirect communication between the communication device 608 and the dynamic user location system 620, irrespective of physical or logical separation. The network 612 also may allow direct or indirect communication between the supervisory user 605 and the dynamic user location system 620, and between the supervisory user 605 and the subordinate user 607. The network 612 may access or include various sources of information, such as, for example, third party information or services, email, a discussion group, a chat room, a news service, a broker service, a banking service, a shopping service, a weather service, the World Wide Web, or other internet information sources.

The network 612 may employ one or more protocols (i.e., standards, formats, conventions, rules, and structures) to transfer information internally or deliver information to one or more users. The protocols may include, for example, the internet protocol (IP), the transmission control protocol (TCP), the hypertext transfer protocol (HTTP), the file transfer protocol (FTP), the user datagram protocol (UDP), the layer two tunneling protocol (L2TP) and/or the simple mail transfer protocol (SMTP). The network 612 may include, for example, the internet, the World Wide Web, a WAN, a LAN, analog or digital wired and wireless telephone networks (e.g., PSTN, ISDN, or xDSL), radio, television, cable, satellite, and/or any other delivery mechanism for carrying data. The network 612 may be secured or unsecured, public or private.

The dynamic user location system 620 may enable the supervisory user 605 to interact online with the subordinate user 607, and to do so, for example, by using instant messaging or email. The dynamic user location system 620 also may enable the supervisory user 605 to interact with the subordinate user 607 using a voice communication provided, for example, using a wireless mobile device. The dynamic user location system 620 allows the supervisory user 605 to view present and past locations of the subordinate user 607 so that the supervisory user 605 may determine the desirability of or need for communicating with the subordinate user 607.

In one implementation, the dynamic user location system 620 works to identify a television program viewed by the subordinate user 607. The dynamic user location system 620 may enable the supervisory user 605 to join the subordinate user 607 in viewing the television program and/or to interact during the television program with the subordinate user 607, using, for example, instant messaging and/or any other appropriate form of electronic messaging. The ability to interact dynamically and in real time with the subordinate user 607 (e.g., a child) may significantly enhance the real and perceived value of television programming by aiding parents, perhaps while away from their children, to participate in or monitor their children's viewing experience.

The dynamic user location system 620 includes a determination service 625 to determine dynamically the locations (e.g., online and/or physical) of the subordinate user 607. To make this determination with respect to online location 610, the determination service 625 may monitor dynamically the online activities of the subordinate user 607, such as, for example, the opening of a Web page of the network 612, focus upon an opened web page (e.g., by clicking on an open Web page or a portion thereof), and/or entry into a chat room or a news group. With respect to the physical location 609, the determination service 625 may obtain location information from a GPS of the communication device 608. The determination service 625 also may determine physical location 609 from location information stored by communication device 608 and/or based on location information accessed by the determination service 625 in relation to an identifier of the communication device (e.g., an internet protocol address, a phone number, an area code or a screenname). Having determined physical location information related to the subordinate user 607, the determination service 625 may communicate that information to the information management service 630.

The information management service 630 is similar generally to the information management service 430 of FIG. 4. To manage information related to the subordinate user, the information management service 630 may include and/or access a database service 631 and a parental control service 633. The database service 631 may include a database, such as, for example, a relational database, for storing or referencing information related to online and/or physical locations visited by the subordinate user 607. In general, the location information includes information, such as, for example, an identification of a physical location (e.g., a longitude and latitude, an address, a neighborhood or a town or city) and/or an online location (e.g., a URL, a web site, a chat room or a news group). The database service 631 also may store or reference notification information or information identifying a physical and/or online location of the supervisory user to provide notifications to the supervisory user in response to alert triggers.

The location information may identify a location based on a hierarchical relationship. For example, the location information may identify as within the same location an online news site and web pages hierarchically associated with that site, or a television channel and programming associated with that channel.

In any event, the database service 631 may add or remove location information from the database in view of parental controls and/or system defaults. For example, the database service 631 may record only locations that have been visited but that have not been pre-approved (e.g., through the parental controls based on a white list). The database service 631 also may remove from the database (e.g., allow to be overwritten by the database) information that was stored previously but that relates to locations visited outside of a designated interest window (e.g., information relating to a location visited 48 hours ago when the window of interest is the preceding 24 hours).

The parental controls service 633 may enable parental controls similar to those accessed using the "Parental Controls" button 375 of FIG. 3. In general, the parental controls service 633 may be configured to allow a parent (e.g., the supervisory user 605) to control the monitoring of the locations visited by a child (e.g., the subordinate user 607). The parental controls service 633 also may enable a parent to establish or configure alert triggers in order to receive notifications based on compliance or non-compliance with the parental controls. The parental controls service 633 may employ a white list and/or a black list, as described relative to button 375 of FIG. 3, and the parent may be enabled to modify the white list or the black list. For example, the parent may decide to remove from a black list a Tom and Jerry® cartoon web site placed on the black list because of cartoon violence.

The parental controls service 633 may be configured to permit the supervisory user 605 to define a window of location information of which the supervisory user 605 wishes to be informed. For example, the supervisory user 605 may specify a time window that is either fixed (e.g., Mar. 13, 2004) or moving (e.g., the last 24 hours) for which the supervisory user 605 desires location information. The supervisory user 605 also may specify a numerical window that indicates a desire for location information regarding a specified number of the locations most recently visited and/or most frequently visited (e.g., the ten locations most recently or frequently visited) by the subordinate user 607.

The parental controls service 633 may screen a location based upon an analysis of text and/or a label associated with the location. For example, the parental controls service 633 may analyze the language of an online site to determine whether the online site includes inappropriate subject matter. Textual analysis may indicate, for instance, that visits to an online site should be reported because the online site relates to gambling (e.g., based on language that includes "gambling," "sportbook," "jackpot," "casino," "bonus," "bingo," "roulette," "odds," "house," and/or "blackjack"). In another example, a physical location may be identified for reporting as a pool hall based on an associated label including the term "billiards." In addition, or in the alternative, the location label may include an express identification of the age appropriateness of the location. The parental controls service 633 may enable a child's parent to select or modify the information or algorithms used to screen the locations based on the textual analysis.

The parental controls service 633 additionally may enable the parent to place a time based restriction on the child's visit to a location. For example, a visit to a friend's home may be restricted during school or homework hours, or visits to online locations may be restricted to no more than forty-five minutes a day. Other recognized control techniques also may be applied by the parental controls service 633.

The database service 631 and the parental controls service 633 may or may not be incorporated within the same hardware and/or software device, depending, for example, on an anticipated workload of the information management service 630. Structuring the information management service 630 to include a separable database service 631 and parental controls service 633 may improve the scalability of the information management service 630.

The dynamic user location system 620 also includes an interface service 635. The interface service 635 communicates between the supervisory user 605 and the information management service 630. The interface services 635 may include a print service, a file access service, an IM service, an operating system, an operating system kernel, an authentication service, an authorization service, and/or any combination of these or other services.

More specifically, the interface service 635 includes an informing service 636 and a control service 638 to communicate between the supervisory user 605 and the information management service 630. The control service 638 is configured to communicate requests, instructions, and/or configuration information from the supervisory user 605 to the information management service 630. For example, the control service 638 may be configured as a conduit by which the supervisory user 605 may access and configure parental controls and/or other control information or parameters maintained, for example, by the parental controls service 633 of the information management service 630. The supervisory user 605 also may use the control service 638 to query the database service 631 for location information related to the subordinate user 607.

The informing service 636 is configured to communicate information from the information management service 630 to the supervisory user 605. For example, in response to a query provided through the control service 638, the informing service 636 may communicate to the supervisory user 605 the current parental control configuration and/or system defaults maintained by the parental controls service 633. The informing service 636 also may communicate to the supervisory user 605 location information of the subordinate user 607 provided by the database service 631. The informing service may use the online interface 615 as a conduit to communicate information to the supervisory user 605.

The online interface 615 may correspond generally to the GUIs described with respect to FIGS. 1-3. For example, the online interface 615, alone or in conjunction with the interface service 635, may enable the supervisory user 605 easily to communicate with the subordinate user 607 in relation to the location information or otherwise. The supervisory user 605 may be enabled to modify the presentation of the location information related to the subordinate user 607 (e.g., to select among different views or detail levels of the location information as shown in FIGS. 1-3), to obtain related follow-on information, and/or to select or filter information based on various criteria (e.g., based on a selected time period or a specified parental control).

The online interface 615 may receive location information from the dynamic user location system 620 based on a query of the online interface 615. The online interface 615 also may receive location information from the dynamic user location system 620 automatically after a change in the subordinate user's location and/or at any time that the logged location information changes. For example, the online interface 615 may receive updated location information at short periodic intervals, such as, for example, every 30 or 60 seconds. In any event, the online interface 615, alone or in conjunction with the dynamic user location system 620, may perform sorting, prioritizing, or other types of organizational processing on the location information presented to the supervisory user 605 so that the location information is provided in a desired fashion. Typically, the online interface 615 and/or the dynamic user location system 620 will include a software program or a piece of code to cause the operation described above.

The online interface 615 may receive and present information to the supervisory user 605 using a standard protocol, such as, for example, the standard generalized markup language (SGML), the extensible markup language (XML), the hypertext markup language (HTML), the extensible hypertext markup language (XHTML), the compact hypertext markup language (cHTML), the virtual reality markup language (VRML), the wireless markup language (WML), the voice extensible markup language (VXML), the short message service (SMS), a document object model (DOM), the simple object access protocol (SOAP), or the dynamic hypertext markup language (DHTML). The online interface 615 may present the information to the supervisory user 605 in a manner that enables the supervisory user 605 to respond to, or to interact with, the presented information.

The dynamic user location system 620 may optionally be incorporated within the same hardware or software device, depending, for example, on an anticipated workload. The dynamic user location system 620 also may be implemented in a logically or physically distributed fashion to improve maintainability, cost, and/or scalability.

Each of the communication device 608, the online interface 615, the network 612, and the dynamic user location system 620 may include further mechanisms for communicating data, such as, for example, the short message service (SMS), the wireless application protocol (WAP), the transport connection protocol (TCP), the internet protocol (IP), the World Wide Web, one or more LANs, and/or one or more WANs. The communication device 608, the online interface 615, the network 612, and the dynamic user location system 620 also may include analog or digital wired and wireless communications networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying data.

One or more other services may be included in the components of system 600 and/or these components (hereinafter the system services) may be included as part of one or more other services. For example, the system services may include or be included in a general-purpose or a special-purpose computer (e.g., a personal computer, a PDA, or a device specifically programmed to perform certain tasks), a local area network, and/or a wide area network. In either case, the response to and execution of instructions received by any or all of the system services may be controlled by, for example, a program, a piece of code, an instruction, a device, a computer system, or a combination thereof, for independently or collectively instructing the services to interact and operate as described herein.

Figure 7A:
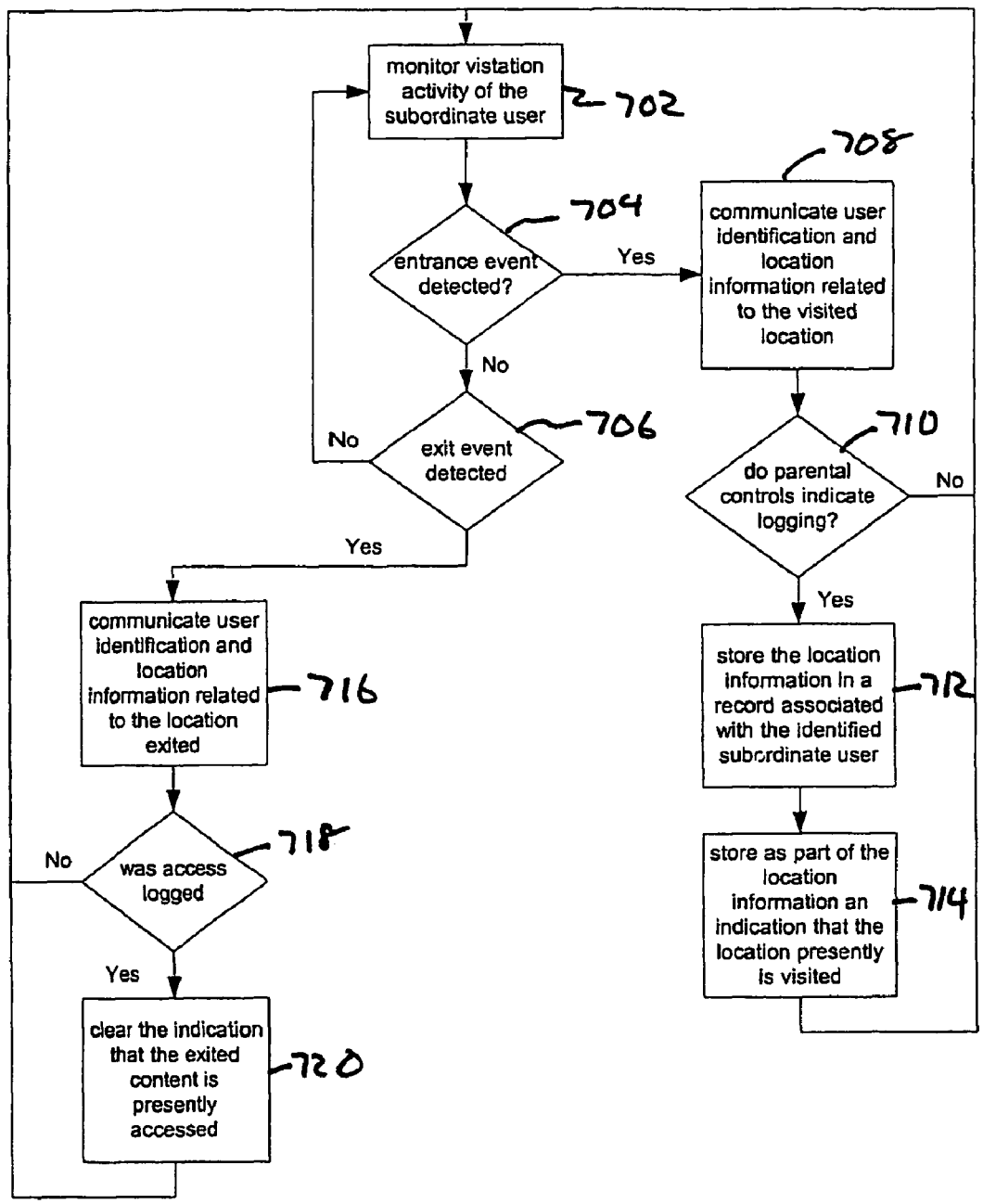
FIGS. 7A-7C are flow diagrams illustrating exemplary processes implementable by the user location system of FIG. 6.
Figure 7B:
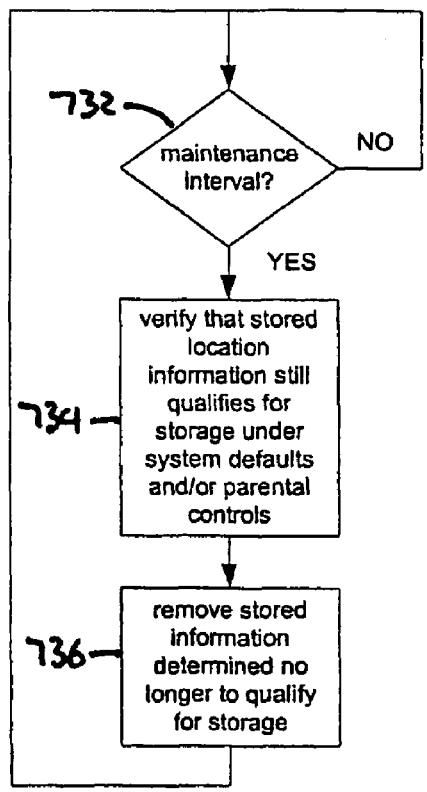
Figure 7C:
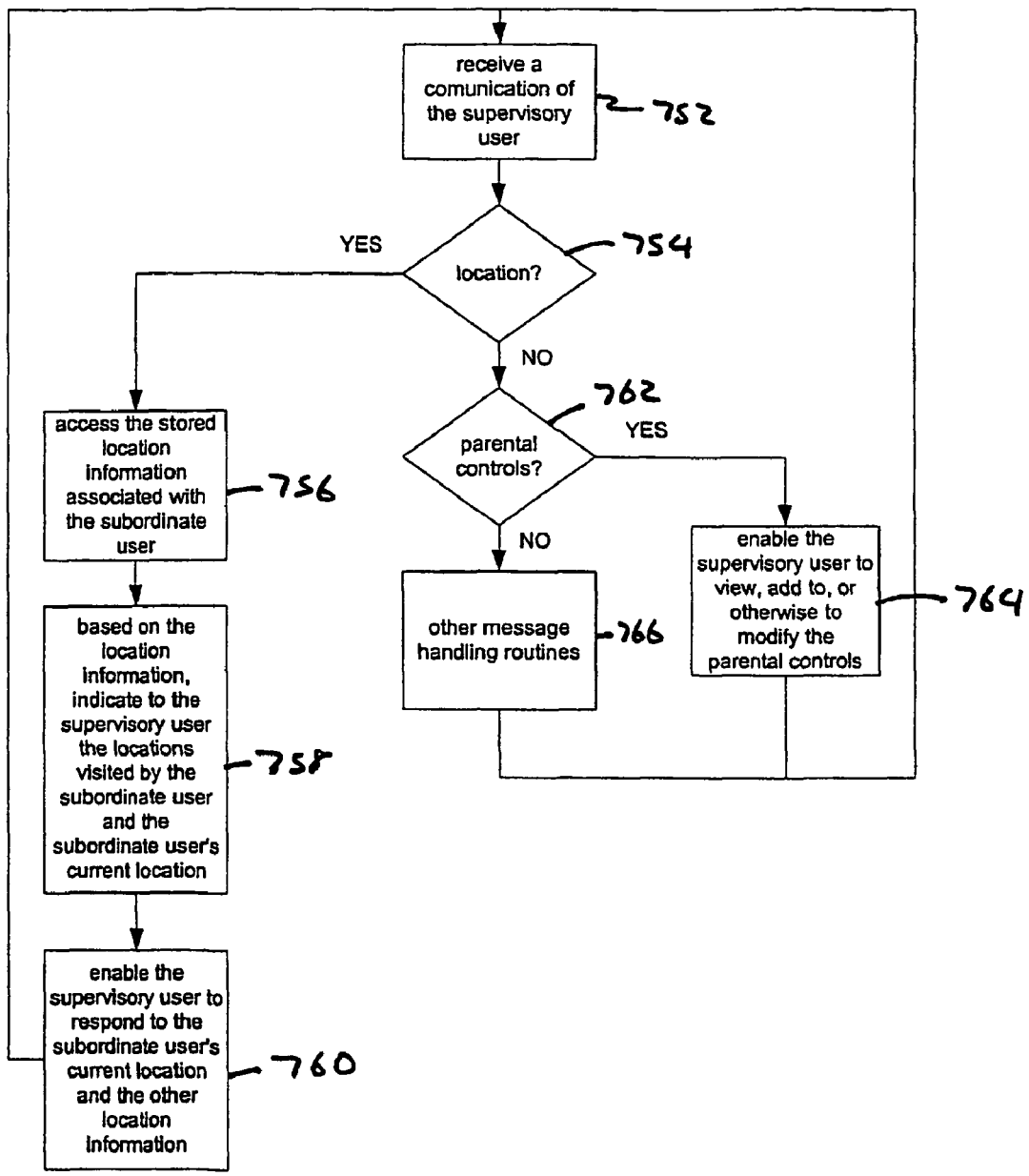

FIGS. 7A-7C illustrate a method implementable by the dynamic user location system of FIG. 6. The method includes a logging procedure 700 (FIG. 7A) used to monitor the visitation activity of the subordinate user, a maintenance procedure 730 (FIG. 7B) used to maintain stored location information, and an interface procedure 750 (FIG. 7C) used to communicate with the supervisory user. The logging, maintenance, and interface procedures may be performed asynchronously and/or concurrently to each other.

Referring to the logging procedure 700 of FIG. 7A, visitation activity of the subordinate user 607 is monitored for entrance or exit events (step 702). Monitoring continues as long as neither an entrance event nor an exit event is detected (steps 704 and 706).

If an entrance event (e.g., entry into a physical location, opening of an online location, focusing on an online location) is detected (step 704), then a user identification and location information related to the visited location is communicated (step 708). If the parental controls and/or system defaults do not indicate that logging is required (step 710), then monitoring of the subordinate user's visitation activity resumes (step 702). Otherwise, if logging is required (step 710), then the location information is stored in a database record associated with the subordinate user to indicate that the subordinate user has visited the location (step 712). An indication also is stored that the location is the present location of the subordinate user (step 714). Thereafter, monitoring resumes (step 702).

In the event that an exit event is detected (step 706), the user identification and location information related to the location exited is communicated (step 716). If the subordinate's user's visit to the location was logged (step 718) then the indication that the subordinate user presently is at that location is cleared (step 720). Thereafter, or if the visit to the exited location was not logged (step 718), monitoring of the subordinate user's visitation activity resumes (step 702). Multiple steps may be performed concurrently.

Referring to FIG. 7B, the maintenance procedure 730 is performed upon a predetermined or automatically determined maintenance interval (step 732). In accordance with the maintenance interval, verification is made that stored location information still qualifies for storage based on the system defaults and/or parental controls (step 734). Verification may include, for example, ensuring that the stored location information continues to satisfy a moving window of interest indicated by the parental controls (e.g., that the location information relates to a visit made within 48 hours of the present time). In any event, stored information that fails presently to satisfy the system defaults and/or parental controls may be removed or purged (step 736). Multiple steps may be performed concurrently.

Referring to the interface procedure 750 of FIG. 7C, a communication of the supervisory user is received (step 752). If the communication is a request for location information (step 754), then stored location information associated with the subordinate user is accessed (step 756). The subordinate user's present location and/or other locations visited by the subordinate user are presented to the supervisory user based on the logged location information (step 758). In addition, the supervisory user may be enabled to act based on the presented location information (step 760). For example, the supervisory user may be enabled to communicate (e.g., via email, instant message, or mobile device) with the subordinate user based on or in relation to a location visited by the subordinate user. In the case of an online location, the supervisory user may be enabled further to join the subordinate user at a present online location or to access past locations visited by the subordinate user.

On the other hand, if the communication is for access to the parental controls (step 762), then the supervisory user may be enabled to view, add to, or otherwise modify the parental controls as desired (step 764). For example, the supervisory user may be enabled to modify or replace either a white list or a black list, to add or modify a time component, and/or to otherwise control or specify logging criteria to control storage or access to location information related to the subordinate user.

For messages of other types (i.e., not relating to a location request or to parental controls), other message handling routines may be employed as appropriate (step 766). In any event, irrespective of the message type received and handled, monitoring continues for other communications of the supervisory user (step 752). Multiple steps may be performed concurrently.

Other implementations are within the scope of the following claims.

What is claimed is:

1. A method of providing location information, the method comprising:
    using a computer to electronically determine an online location accessed by a first user and a geographic location at which the first user accessed the online location;
    using a database to store location information indicative of the determined online and geographic locations;
    receiving an indication to locate the first user to a second user;
    using a user interface to inform the second user that the first user accessed the online location while at the geographic location based on the stored location information; and
    receiving parental control information comprising a black list indicative of one or more online locations disapproved for visitation by the first user,
    wherein the storing of the location information or the informing to the second user is based on the parental control information.

2. The method of claim 1 wherein the storing further comprises storing location information indicative of past locations of the first user and wherein the informing further comprises informing the second user of a past location of the first user.

3. The method of claim 1 further comprising receiving parental control information, wherein:
    the storing or the informing are based on the parental control information; and
    the parental control information comprises a white list indicative of an online location approved for visitation by the first user.

4. The method of claim 3 wherein the second user is not informed of the location visited by the first user if the location is included in the white list.

5. The method of claim 3 wherein the second user is informed of the location visited by the first user if the location is not included in the white list.

6. The method of claim 1 wherein the second user is informed of the location visited by the first user if the location is included in the black list.

7. The method of claim 1 further comprising receiving parental control information, wherein:
    the storing or the informing are based on the parental control information; and
    the parental control information comprises a time constraint on locations visited by the first user.

8. The method of claim 1 further comprising receiving parental control information, wherein:
    the storing or the informing are based on the parental control information; and
    the parental control information comprises a window definition indicative of a range of location information of which the second user will be informed.

9. The method of claim 8 wherein the range of location information indicated by the window definition includes a predetermined number of the most recent locations visited by the first user.

10. The method of claim 8 wherein the range of location information indicated by the window definition includes locations visited by the first user within a defined period of time.

11. The method of claim 1 further comprising receiving parental control information, wherein:
    the storing or the informing are based on the parental control information; and
    the parental control information comprises a preference that the second user be informed of an online location most frequently visited by the first user.

12. The method of claim 1 wherein the second user and the first user are associated through a familial relationship.

13. The method of claim 1 further comprising:
    using the computer to determine a changed location of the first user;
    using the database to update the stored location information based on the changed location; and using the user interface to inform the second user of the changed location based on the updated stored location information.

14. The method of claim 1 further comprising enabling the second user to communicate with the first user in relation to an online location visited by the first user.

15. A computer storage medium storing a computer program configured to provide location information, the computer program comprising one or more code segments that, when executed, cause one or more processors to:
   determine an online location accessed by a first user and a geographic location at which the first user accessed the online location;
   store location information indicative of the determined online and geographic locations;
   receive an indication to locate the first user to a second user; and
   inform the second user that the first user accessed the online location while at the geographic location based on the stored location information; and
   receiving parental control information comprising a black list indicative of one or more online locations disapproved for visitation by the first user,
   wherein the storing of the location information or the informing to the second user is based on the parental control information.

16. The medium of claim 15 wherein the storing further comprises storing location information indicative of past locations of the first user and wherein the informing further comprises informing the second user of a past location of the first user.

17. The medium of claim 15, wherein the stored computer program further causes the one or more processors to receive parental control information, wherein:
   the storing or the informing are based on the parental control information; and
   the parental control information comprises a white list indicative of an online location approved for visitation by the first user.

18. The medium of claim 17 wherein the second user is not informed of the location visited by the first user if the location is included in the white list.

19. The medium of claim 17 wherein the second user is informed of the location visited by the first user if the location is not included in the white list.

20. The medium of claim 15 wherein the second user is informed of the location visited by the first user if the location is included in the black list.

21. The medium of claim 15, wherein the stored computer program further causes the one or more processors to receive parental control information, wherein:
   the storing or the informing are based on the parental control information; and
   the parental control information comprises a time constraint on locations visited by the first user.

22. The medium of claim 15 wherein the stored computer program further causes the one or more processors to receive parental control information, wherein:
   the storing or the informing are based on the parental control information; and
   the parental control information comprises a window definition indicative of a range of location information of which the second user will be informed.

23. The medium of claim 22 wherein the range of location information indicated by the window definition includes a predetermined number of the most recent locations visited by the first user.

24. The medium of claim 22 wherein the range of location information indicated by the window definition includes locations visited by the first user within a defined period of time.

25. The medium of claim 15 wherein the stored computer program further causes the one or more processors to receive parental control information, wherein:
   the storing or the informing are based on the parental control information; and
   the parental control information comprises a preference that the second user be informed of an online location most frequently visited by the first user.

26. The medium of claim 15 wherein the second user and the first user are associated through a familial relationship.

27. The medium of claim 15 wherein the stored computer program further causes the one or more processors to:
   use the computer to determine a changed location of the first user;
   use the database to update the stored location information based on the changed location; and
   use the user interface to inform the second user of the changed location based on the updated stored location information.

28. The medium of claim 15 wherein the stored computer program further causes the one or more processors to enable the second user to communicate with the first user in relation to an online location visited by the first user.

29. A system for providing location information, the system comprising one or more processors connected to one or more storage devices, the system being configured to:
   determine an online location accessed by a first user and a geographic location at which the first user accessed the online location;
   store location information indicative of the determined online and geographic locations;
   receive an indication to locate the first user to a second user;
   inform the second user that the first user accessed the online location while at the geographic location based on the stored location information; and
   receiving parental control information comprising a black list indicative of one or more online locations disapproved for visitation by the first user,
   wherein the storing of the location information or the informing to the second user is based on the parental control information.

30. The system of claim 29, wherein the storing further comprises storing location information indicative of past locations of the first user and wherein the informing further comprises informing the second user of a past location of the first user.

31. The system of claim 29, wherein the system is further configured to receive parental control information, wherein:
   the storing or the informing are based on the parental control information; and
   the parental control information comprises a white list indicative of an online location approved for visitation by the first user.

32. The system of claim 31 wherein the second user is not informed of the location visited by the first user if the location is included in the white list.

33. The system of claim 31 wherein the second user is informed of the location visited by the first user if the location is not included in the white list.

34. The system 29 wherein the second user is informed of the location visited by the first user if the location is included in the black list.

35. The system of claim 29, wherein the system is further configured to receive parental control information, wherein:
the storing or the informing are based on the parental control information; and
the parental control information comprises a time constraint on locations visited by the first user.

36. The system of claim 29, wherein the system is further configured to receive parental control information, wherein:
the storing or the informing are based on the parental control information; and
the parental control information comprises a window definition indicative of a range of location information of which the second user will be informed.

37. The system of claim 36 wherein the range of location information indicated by the window definition includes a predetermined number of the most recent locations visited by the first user.

38. The system of claim 36 wherein the range of location information indicated by the window definition includes locations visited by the first user within a defined period of time.

39. The system of claim 29, wherein the system is further configured to receive parental control information, wherein:
the storing or the informing are based on the parental control information; and
the parental control information comprises a preference that the second user be informed of an online location most frequently visited by the first user.

40. The system of claim 29 wherein the second user and the first user are associated through a familial relationship.

41. The system of claim 29, wherein the system is further configured to:
use the computer to determine a changed location of the first user;
use the database to update the stored location information based on the changed location; and
use the user interface to inform the second user of the changed location based on the updated stored location information.

42. The system of claim 29, wherein the system is further configured to enable the second user to communicate with the first user in relation to an online location visited by the first user.

* * * * *

UNITED STATES PATENT AND TRADEMARK OFFICE
CERTIFICATE OF CORRECTION

PATENT NO.       : 8,122,137 B2
APPLICATION NO.  : 11/574831
DATED            : February 21, 2012
INVENTOR(S)      : Barry Appelman et al.

It is certified that error appears in the above-identified patent and that said Letters Patent is hereby corrected as shown below:

Claim 15, col. 15, line 17, delete "and".

Signed and Sealed this
Twenty-sixth Day of June, 2012

David J. Kappos
*Director of the United States Patent and Trademark Office*